July 16, 1968    H. V. PURDY ET AL    3,393,305
ELECTRICAL ARITHMETIC EQUIPMENT
Filed July 27, 1965    3 Sheets-Sheet 1

| EXISTING CONDITION | DIRECTLY APPLIED BIT | INCOMING CARRY | NEW CONDITION | OUTGOING CARRY |
|---|---|---|---|---|
| 1 | 0 | 0 | 1 | 0 (A) |
| 1 | 1 | 0 | 0 | 1 (B) |
| 1 | 0 | 1 | 0 | 1 (B) |
| 1 | 1 | 1 | 1 | 1 (C) |
| 0 | 0 | 0 | 0 | 0 (D) |
| 0 | 1 | 0 | 1 | 0 (A) |
| 0 | 0 | 1 | 1 | 0 (A) |
| 0 | 1 | 1 | 0 | 1 (B) |

RESULTING COMBINATIONS 1, 0 — A
0, 1 — B
1, 1 — C
0, 0 — D

INVENTORS
HAYDN VICTOR PURDY
RONALD CAMPBELL MC INTOSH

BY:
*Darbo, Robertson & Vandenburgh*
ATTORNEYS

| | 1 | 2 | 4 | 8 | 16 | | |
|---|---|---|---|---|---|---|---|
| TO ADD | 0 | 1 | 1 | 0 | 1 | = | 22 |
| | 1 | 1 | 1 | 0 | 0 | = | 7 |
| | 1 | 0 | 1 | 1 | 1 | = | 29 |

July 16, 1968  H. V. PURDY ETAL  3,393,305
ELECTRICAL ARITHMETIC EQUIPMENT
Filed July 27, 1965  3 Sheets-Sheet 3

INVENTORS
HAYDN VICTOR PURDY
RONALD CAMPBELL MC INTOSH

BY: ATTORNEYS

United States Patent Office 3,393,305
Patented July 16, 1968

3,393,305
ELECTRICAL ARITHMETIC EQUIPMENT
Haydn Victor Purdy, 30 Fontenoy Road, London, England, and Ronald Campbell McIntosh, Hertfordshire, Skimpans, Welham Green, England
Filed July 27, 1965, Ser. No. 475,140
Claims priority, application Great Britain, July 31, 1964, 30,308/64
2 Claims. (Cl. 235—175)

ABSTRACT OF THE DISCLOSURE

Electrical arithmetic equipment comprising a plurality of stages and electrical control switches and circuits operable in accordance with existing arithmetic conditions at each stage and in accordance with arithmetic conditions applied thereto, to cause simultaneously at all stages, all the changes in the setting of the equipment consequent to the application of arithmetic conditions thereto. A single tree circuit is used in the first stage and two tree circuits are used in parallel in each succeeding stage.

---

Figures 1, 2:
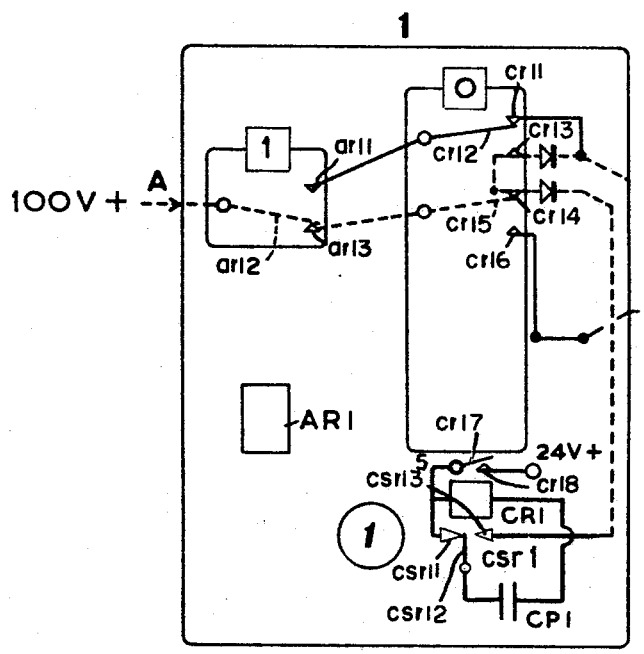

This invention relates to arithmetic equipment such as adders and subtractors, and its object is to accelerate the operations at a plurality of stages consequent on the application of arithmetic conditions thereto: for example, "carry" operations in an adder or subtractor.

The main aspect of the invention comprises arithmetic equipment comprising a plurality of stages and electrical control switches and circuits operable in accordance with existing arithmetic conditions at each stage and in accordance with arithmetic conditions applied thereto, to cause simultaneously at all stages, all the changes in the setting of the equipment consequent on the application of arithmetic conditions thereto.

This can apply, for example, to a parallel adder, or a serial adder, or to subtractor equipment of each said type.

The invention will be described with reference to a multi-stage parallel adder shown in the accompanying drawings. Each stage is provided with an expanding tree of switchable paths equal in number to all the possible operational variations of which the stage is capable and outputs from each stage both for automatically changing its own setting and for signalling Carry or No Carry to the inputs to the expanding tree at the succeeding stage so that the trees are in series and a single path can be completed throughout all the stages by simultaneous switching operations at all the stages, whereby a one-shot multi-stage binary adder is provided.

In the drawings:

FIG. 1 shows all the possible conditions which can arise at any stage of a parallel binary adder other than the first, taking into account its existing condition, a directly-applied bit, and an incoming Carry.

Figure 3:
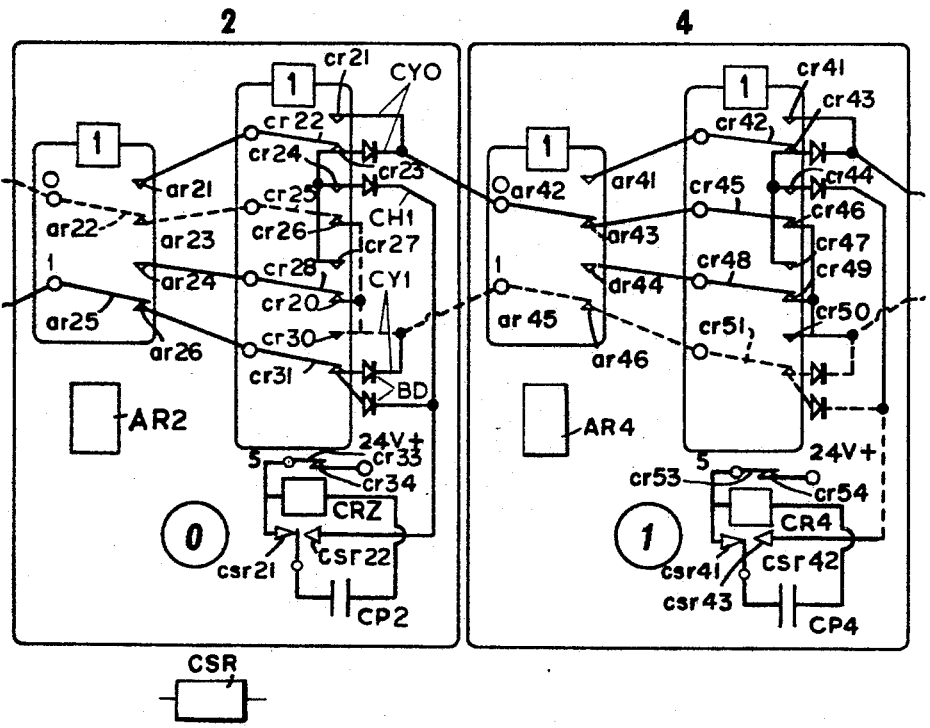
Figure 4:
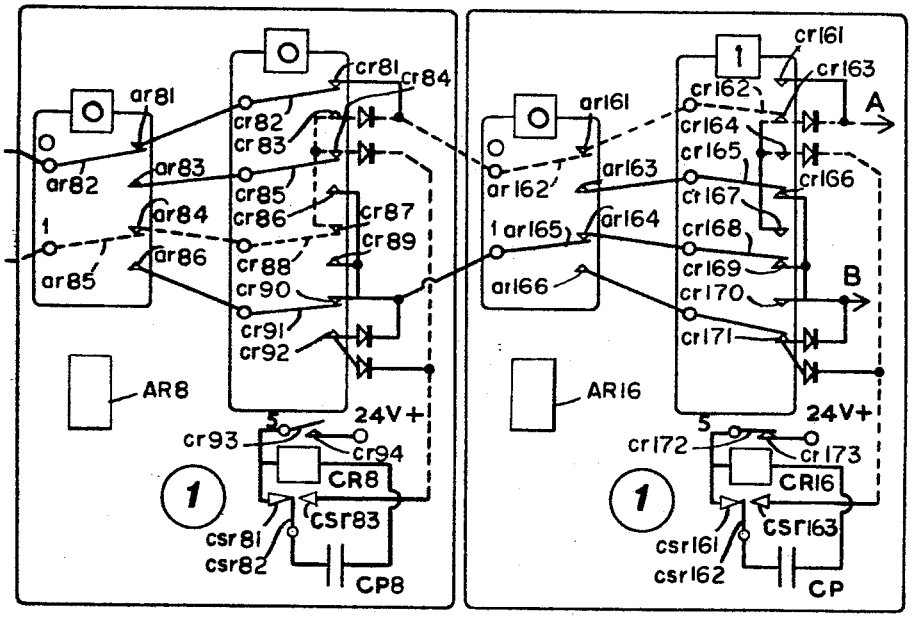
Figure 5:
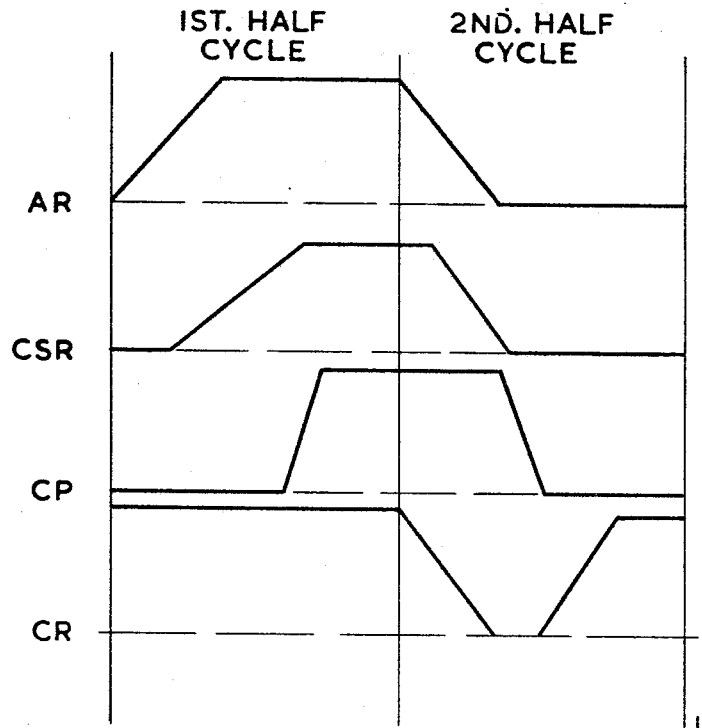

FIGS. 2, 3, and 4, which should be placed side by side from the left in that order, show five stages of a parallel binary adder incorporating the invention, while FIG. 5 shows the cycle of operations of the devices of an adder stage during the addition of "1" to a stored "1."

FIG. 1 is self-explanatory. In particular if two or three of the three simultaneous conditions at a stage are Ones, then there must be a carry.

Each stage in the adder, after the first, FIG. 2, starts with two inputs 0 and 1 which are connected to the 0 and 1 Carry leads (for example CY0, CY1, FIG. 3) from the preceding stage. Since there is no Carry to the first stage in an adder, the first stage, FIG. 2, consists soley of a permanent "0" input battery condition A and the upper half of the complete tree circuit of any one stage shown in FIGS. 3, 4 together with the adder relay AR to be described below, and the connections from the half-tree to the capacitor-relay circuit including capacitor CP and relay CR and to the Carry leads.

The 1 and 0 Carry Input leads CY0, CY1, FIG. 3 to a stage are connected to the moving contacts of two pairs of change-over contacts $ar1$, $arX1$, X2, X3 and $arX4$, X5, Xc, where X is the number appended to the respective AR relay belonging to an adder relay AR arranged to operate the change-overs to their 0 and 1 positions respectively in response to 0 or 1 input signals. The four fixed contacts for example $ar21$, 22, 24 and 26 of the two change-overs are connected to the moving contacts, for example $cr21$, 23; $cr24$–26; $cr27$–29 and $cr30$–32, of two pairs of change-overs $cr1$, 2; $cr3$, 4; belonging to the register relay CR which records the current 1, or 0, condition of the stage.

Eight outputs from the relay CR have to provide sets of conditions involving multiplying of varying groups of the outputs.

The set of eight output contacts, for example, $cr21$, 23, 24, 26, 27, 29, 30, 32, are multiplied into two groups CY1, CY0, shown in Stage two, FIG. 3, according to the Carry conditions for the situations they represent and the two connecting wire multiples CY1, CY0 are connected to the succeeding stage as Carry inputs 1 and 0. Certain of the eight outputs are also connected to a "local result" connecting wire multiple described below. The term "connecting wire multiple" is used herein to mean a number of wires connected or commoned together in accordance with its usage in the telephone art.

The "local result" 1 and 0 condition of a stage in the adder consequent on an addition is temporarily recorded in a capacitor CP individual to the stage.

The circuit of each capacitor CP incorporates change-over contacts for example, $csr21$, 22, 23, FIG. 3, of a relay CSR common to all stages which in its unoperated position closes a circuit for discharging all the capacitors if they are in a highly charged "1" condition, to a level of charge indicative of a "0" condition. Because of this common control, which, as described later, is suitably operated during every addition cycle, there is only need to multiple together those CR output contacts which indicate a "1" (or alternatively "0") condition for the stage in question. The multiple for the "1" condition has the reference CH1, FIG. 3, and is connected to the front contact, for example $csr23$ so as to provide a charging circuit for the respective capacitor CP when potential is connected to the CH1 multiple of a stage from a series circuit through the adder.

The two types of multiple CY0, CY1 and CH1 are strapped to the same set of outlet terminals, and certain outlets require connection to both types of multiple. It is therefore necessary to prevent current flowing via such double connections along unwanted paths when a serial path is set up. For this purpose blocking diodes BD are inserted where necessary to prevent such cross-connections and a study of the circuit will show that they are effectively prevented.

FIG. 5 shows in time relation the operations of the input relay AR of a stage, the common capacitor switch relay CSR, the capacitor CP, and the register relay CR throughout an adding cycle involving addition of a "1" to a stored "1."

The variations for other additive combinations will be obvious.

When the equipment is static, relays AR at all stages, and the common relay CSR, are all deenergized whatever number is registered, while relay CR at each stage is either energized or deenergized according to the value of the bit, 1 or 0, currently recorded therein.

In FIG. 5, relay CR is shown energized at the beginning of the operational cycle shown.

At the commencement of a number adding cycle, a selection of the normally-deenergized input or adding relays AR at the stages are energized corresponding to "1's" in the number to be added. The operation of relays AR in conjunction with the existing conditions of the register relays CR at all stages sets up the serial path through all the stages and activates a selection of the local paths to the individual capacitor circuits according to the relation between the serial path and the output multiples, for example, CH1, FIG. 3, at the stages.

FIGS. 2, 3, 4 show such a serial path and the associated local paths by broken lines. These paths are indicated in the following manner. Each storage relay CR which has a "1" bit currently stored therein is indicated in two ways, (a) the small rectangle (let in to the top of the large rectangle enclosing contacts $cr1$–$cr4$) contains digit "1," whereas the relay CR which is not storing a bit "1" is indicated by digit "0" in the said small rectangle. (b) the moving contacts $cr1$–$cr4$; which can move on their left-hand pivots between the two fixed-position contacts between which the free end of the moving contact moves to make electrical contact with one or other fixed contact; are shown as having been drawn down onto their lower fixed contacts by the energization of the relay CR shown diagrammatically as a rectangle.

The contact immediately above the rectangle CR in Stage 2 (the CR reference for which will be given below) is also shown closed because CR is energized.

Similarly those relays AR, which are operated by a "1" bit applied thereto as indicated in the corresponding small rectangle, have their moving contacts $ar1$, $ar2$ drawn downwards as shown in Stage 2.

Thus, looking at Stages 1, 2, 4, 8, 16; which are thus indicated by the decimal equivalents of the binary digital places which they record; the AR relays are recording in turn 1, 1, 1, 0, 0; while the CR relays are recording 0, 1, 1, 0, 1. The moving contacts of the relays, which record "0" by being in the deenergized condition, are shown on their upper fixed back contacts. The arrangement of the AR and CR contacts shown at the various stages of the adder illustrate the addition sum shown below FIG. 3 and indicated by the numbers in the small squares interposed in the top horizontals of the large and small rectangles enclosing the CR and AR relay contacts at each stage in FIGS. 2, 3 and 4.

The number registered on the relays CR from left to right is 01101, the respective contacts being up for 0 and down for 1. The number to be added is 11100 and is applied to the relays AR at the beginning of the addition cycle. It will be seen that the series path is connected to the local capacitor circuit in stages 1, 3, 4, 5, but not in stage 2, which corresponds to a total of 1011. The blocking diodes BD prevent unwanted current flow into the local capacitor circuit in stage 2.

FIG. 5 shows a cycle at a stage in which relay AR is operated by an inserted digit "1," so that AR operates during the first part of the first half-cycle, and a circuit is completed to its associated capacitor CP.

In parallel with the operation of the relays AR, the common switching relay CSR is energized as shown in FIG. 5; but operates its changeover contacts $csr1$ to the right slightly later than the operation of contacts $ar1$, $2$, as shown in FIG. 5, in which CSR is shown to operate slightly later than AR. The contacts $csr1$ connect their respective capacitors CP to the respective multiples CH1. Input terminal A to Stage 1 is permanently connected to 100 volts positive potential and this potential is now applied through the serial circuit set up and the local capacitor circuits which are connected thereto to the capacitors CP in stages 1, 3, 4, 5. The capacitors are charged practically instantaneously at this voltage before the end of the first half cycle, FIG. 5, the almost vertical charging line for CP being located at the time position in which the operation of CSR is completed.

Power supply to the circuit is now momentarily cut-off by means not shown, so that all the relays release, as shown or AR. CSR and CR at the beginning of the second half-cycle, FIG. 5, CSR being slightly slow-to-release.

Release of the common relay CSR changes over all its contacts, for example, $csr21$, $22$, $csr1$ to close their left-hand contacts, connecting the capacitors CP to the windings of the respective register relays CR. Those capacitors which are charged now discharge through their relay windings as shown in FIG. 5 by CP discharging after CSR has released, and by CR re-operating in response to the discharge of CP giving a fleeting operation of their contacts. The application of 100 volts to the relay windings by such momentary discharge will not damage the relay windings.

Power supply is reconnected in time to lock the operated relays CR via their locking contacts $cr5$ to register the result of the addition by the end of the second half-cycle, FIG. 5.

Successive additions can take place during successive cycles, and after any such addition, the current sum is registered in the adder and can be made available via contacts of the relays CR.

The relay circuits can be replaced by transistor or other electronic circuits and any other suitable type of quick-response device can be used in place of the capacitors.

It will be seen that the series circuit exemplifying the result of a parallel addition is completed at all stages simultaneously by the simultaneous operation of a selection of the input relays AR, and that the charging of the corresponding capacitors, and the consequent operation of the corresponding relays CR respectively take place simultaneously at all the stages affected.

It is clear that the novel technique can be utilized for operations in any radix, and for any type of multi-stage arithmetic equipment involving transfers between stages.

What we claim is:

1. Electrical binary arithmetic equipment which comprises
   (A) a plurality of stages in series,
   (B) a power supply input lead to the first stage,
   (C) a pair of binary Carry leads between each pair of adjacent stages,
   (D) a binary input-responsive device in each stage, and an individual input lead thereto,
   (E) a binary storage device in each stage and an operating circuit therefor,
   (F) a single tree circuit in the first stage and two tree circuits in parallel in each succeeding stage, each tree circuit consisting of first switching means controlled by one of said devices D and E for connecting lead B to one of a pair of intermediate leads, and second switching means controlled by the other of said devices D and E for connecting each of said intermediate leads to one of a respective pair of further leads,
   (G) connections incorporating current blocking devices to each of the outgoing Carry leads from a selection of said further leads in each stage,
   (H) connections AND incorporating blocking devices to the operating circuit of the storage device E in the same stage from a selection of said further leads in each stage, said connections being such that simultaneous operation of a selection of the binary input-responsive devices D results in simultaneous operations at each stage to set up a single circuit through all the stages in series and passing through a selected tree circuit in stages comprising two tree circuits, said single series circuit governing Carry and No Carry between stages and simultaneous selective operation of said binary storage devices E.

2. Electrical binary arithmetic equipment as claimed in claim 1 wherein the binary storage device in each stage comprises
- (J) an electromagnetic contact-making light-current relay and a capacitor alternatively connectable to said connections H, and
- (K) a switching device in each stage for alternately connecting up said storage relay and said capacitor, and which comprises a common electromagnetic contact-making light-current relay controlling said switching devices K at all stages.

References Cited
UNITED STATES PATENTS

| | | | |
|---|---|---|---|
| 2,873,914 | 2/1959 | Hebel | 235—168 |
| 3,155,822 | 11/1964 | Chiang | 235—173 |
| 3,196,312 | 7/1965 | Marrison | 315—171 |

OTHER REFERENCES

Automatic Digital Computers, by M. V. Wilkes, June 1955, pp. 146–147.

MALCOLM A. MORRISON, *Primary Examiner.*

V. SIBER, *Assistant Examiner.*